United States Patent
Kucharewski et al.

(12)

(10) Patent No.: US 7,073,001 B1
(45) Date of Patent: Jul. 4, 2006

(54) FAULT-TOLERANT DIGITAL COMMUNICATIONS CHANNEL HAVING SYNCHRONIZED UNIDIRECTIONAL LINKS

(75) Inventors: Nick Kucharewski, San Jose, CA (US); Yair Hadas, Sunnyvale, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 888 days.

(21) Appl. No.: 10/116,177

(22) Filed: Apr. 3, 2002

(51) Int. Cl.
*G06F 13/42* (2006.01)

(52) U.S. Cl. ............... 710/105; 710/104; 710/107; 710/240; 375/219; 375/356; 375/371; 375/376; 370/453; 370/458; 709/231; 327/155; 198/836.4

(58) Field of Classification Search ......... 375/219, 375/356, 371, 376; 710/105, 104, 107, 240, 710/48; 370/453, 458; 709/231; 327/155; 198/836.4
See application file for complete search history.

(56) References Cited

U.S. PATENT DOCUMENTS

| | | | | |
|---|---|---|---|---|
| 3,639,694 A | * | 2/1972 | Deutsch et al. | 370/458 |
| 3,739,904 A | * | 6/1973 | Windstrup | 198/836.4 |
| 4,042,783 A | * | 8/1977 | Gindi | 370/453 |
| 4,103,336 A | * | 7/1978 | Gindi et al. | 710/105 |
| 4,354,229 A | * | 10/1982 | Davis et al. | 710/104 |
| 4,489,379 A | * | 12/1984 | Lanier et al. | 709/231 |
| 6,215,835 B1 | * | 4/2001 | Kyles | 375/376 |
| 6,426,984 B1 | * | 7/2002 | Perino et al. | 375/356 |
| 6,839,393 B1 | * | 1/2005 | Sidiropoulos | 375/371 |
| 6,861,884 B1 | * | 3/2005 | Nguyen et al. | 327/155 |

\* cited by examiner

*Primary Examiner*—Emmanuel Bayard
*Assistant Examiner*—Sudhanshu C. Pathak
(74) *Attorney, Agent, or Firm*—Jonathan W. Hallman; MacPherson Kwok Chen & Heid LLP

(57) ABSTRACT

A method of synchronizing or initiating channel lock in a serial loop formed by an initializing transceiver and subject transceivers disclosed. Should a transceiver in the serial loop detect that its receiving serial channel is desynchronized, it sends an unlock signal to the next transceiver in the loop. The unlock signal guarantees that the next transceiver's receiving serial channel will be desynchronized. Only the initializing transceiver may initiate a channel lock sequence.

14 Claims, 2 Drawing Sheets

FAULT-TOLERANT DIGITAL COMMUNICATIONS CHANNEL HAVING SYNCHRONIZED UNIDIRECTIONAL LINKS

TECHNICAL FIELD

This invention relates to a fault-tolerant communication channel formed from serial transmission links.

BACKGROUND

High-speed parallel data transmission through interconnect devices and backplanes often suffers from co-channel interference and EMI effects. In particular, skew becomes problematic because the phase relationship between data and clock can be lost as a result of differing travel times within the parallel data channel. As a result, such high-speed parallel data may be serialized before transmission and de-serialized upon reception using serial transmission protocols such as low voltage differential signaling (LVDS) or low voltage current mode signaling (CML).

In an LVDS or CML system, the clock may be embedded within the encoded data, thereby eliminating the skew problem associated with parallel data transmission. To permit the transition between parallel and serial data transmission, serializer/deserializer (SERDES) units are incorporated at both the transmitting and receiving ends of the serial data stream. Despite the advantages provided by serializing the data, certain disadvantages remain. For example, assume that the parallel data is 32 bits wide (thereby forming a 32 bit word) and the word rate is 125 MHz. A SERDES receiving such a parallel data stream would have to provide a serial data stream encoding a 4 GHz bit stream. A conventional SERDES serial channel can run no better than 2 GHz, however. Thus, two SERDES serial channels would be needed—e.g., the most significant 16 bits in each 32 bit word from the parallel data stream could be sent on a first serial channel and the least significant 16 bits could be sent on a second serial channel.

Although a SERDES accommodating such multiple serial channels may be constructed, it introduces a similar problem inherent in the parallel data stream because each serial channel may be incoherent to its companion serial channels. Thus, the multiple serial channels are synchronized by an initial locking signal, which aligns the multiple bitstreams at the receiving SERDES units. This alignment within SERDES applications is typically denoted as "channel lock."

In applications employing multiple serial channels, synchronization schemes to maintain channel lock typically have employed one of two approaches. In a first approach, the data is "packetized" before transmission. Before sending a packet, the transmitter sends a locking signal and establishes a one-way synchronized connection. The packet is then sent. In an analogous fashion, the receiver sends a response packet on its corresponding transmit link. Depending upon the application, the response packet may acknowledge receipt (ack), indicate failure (nack), or otherwise indicate the state of the receive side link. Such a sequence of events is fundamental to packet-switched networks. Although robust with respect to each packet, this first approach suffers from redundancy—for each packet, the locking signal is transmitted regardless of whether the link was already locked. Such redundancy slows the overall data transmission rate.

In a second approach, the high-speed serial channels are regarded as unreliable so that a second channel, which is more stable (and presumably more reliable) than the serial channels is used to communicate feedback from one SERDES to another. In this fashion, a transceiver communicating to another transceiver through a SERDES-coupled serial channel may be assured that it transmits a properly synchronized signal or told to resynchronize the channel. Although this second approach does not suffer the redundancy of the first approach, it requires the hardware and support necessary for the extra (out-of-band) channel.

Accordingly, there is a need in the art for improved methods to initiate and maintain channel lock in serial applications.

SUMMARY

In accordance with one aspect of the invention, a method for communicating between two transceivers, wherein each transceiver has a corresponding transmitting serial channel and a receiving serial channel, the transmitting serial channel for each transceiver being the receiving serial channel for the remaining transceiver includes an act of establishing duplex communication between the transceivers such that each transceiver's receiving serial channel is synchronized. From this synchronized state, either transceiver may detect a loss of synchronization in its receiving serial channel of either transceiver. The detecting transceiver transmits a signal over its transmitting serial channel to the remaining transceiver, wherein reception of the signal by either transceiver causes its receiving serial channel to become desynchronized. As a result, the loss of synchronization in a receiving serial channel of a given transceiver is propagated to the remaining transceiver's receiving serial channel.

DETAILED DESCRIPTION

Figure 1:
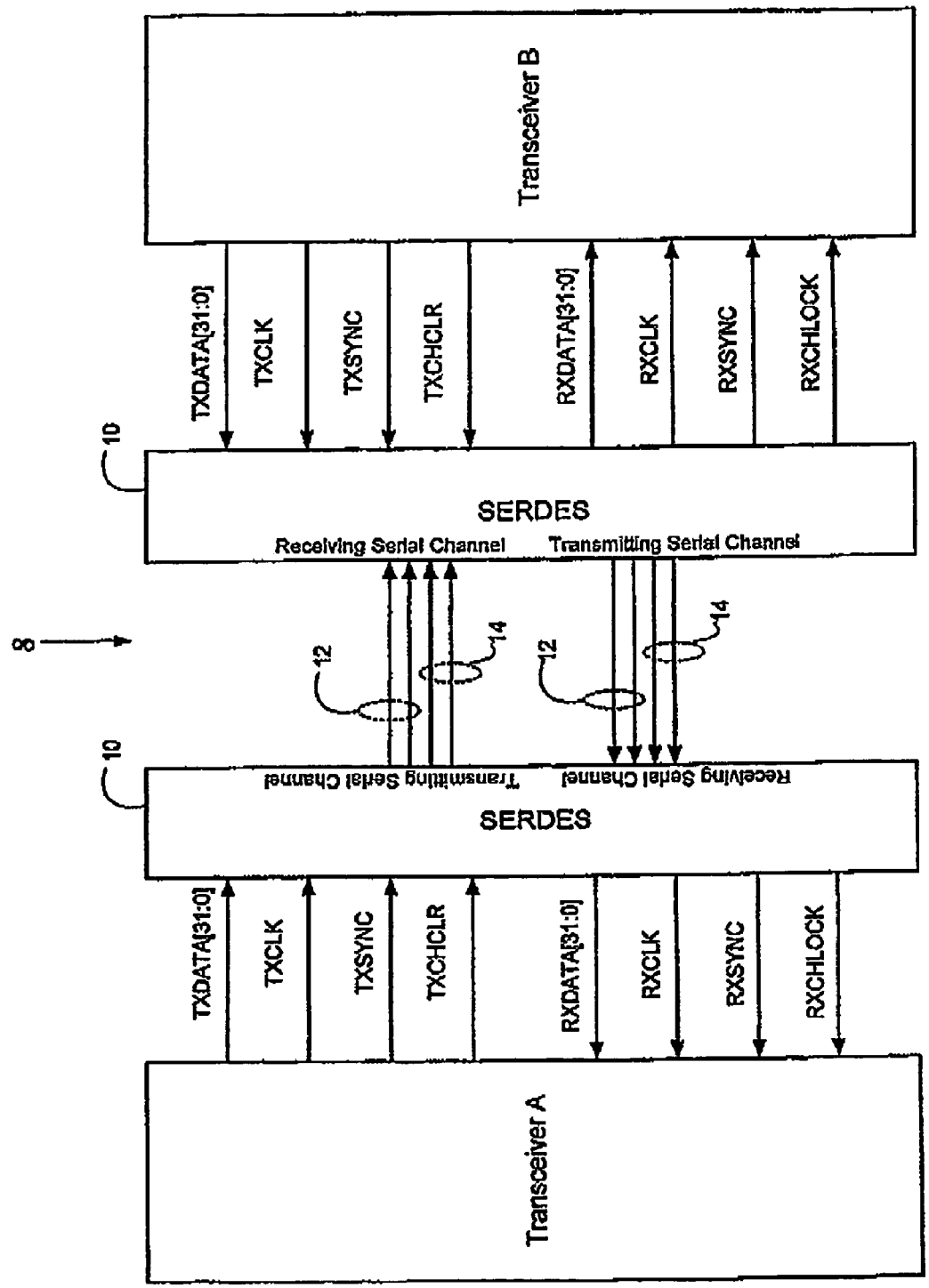
FIG. 1 is block diagram for a loop having one subject transceiver according to one embodiment of the invention.

Referring now to the drawings, FIG. 1 illustrates a fault-tolerant synchronized serial loop 8. Transceivers A and B may each transmit a 32-bit wide word TXDATA to their respective serializer/deserializer (SERDES) units 10 and receive a 32-bit wide word RXDATA from their respective SERDES units 10. If transceivers A and B each transmits words TXDATA at a 125 MHz rate and each SERDES unit 10 were to transmit into a single serial channel, the resulting serial transmission rate in each serial channel is 125 MHz*32=4 GHz. But if each SERDES unit 10 can only support a transmission rate of 2 GHz per serial channel, then each SERDES unit 10 must transmit into two serial channels 12 and 14 that collectively may be denoted as a transmitting serial channel. In turn, the SERDES unit 10 receiving serial channels 12 and 14 may collectively denote these same serial channels as a receiving serial channel. When implemented in a low voltage differential signaling (LVDS) or low voltage current mode (CML) format, each serial channel 12 and 14 requires two signals. A given 32-bit word TXDATA received by a SERDES unit 10 must be appropriately assigned across its two serial channels 12 and 14. For example, the 16 most-significant bits could be transmitted on serial channel 12, and the 16 least-significant bits could be transmitted on serial channel 14.

Each SERDES unit 10 may receive a transmit clock TXCLK from its respective transceiver. In turn, each SERDES unit 10 may provide a recovered serial clock RXCLK to its transceiver. The transmitted words TXDATA provided to each SERDES 10 by its transceiver may be organized on a switch-cycle basis as determined by synchronizing pulses TXSYNC. For example, a switch cycle of 264 TXCLK cycles may begin with TXSYNC being asserted for one TXCLK cycle. This TXSYNC signal may also be used as follows. A given SERDES unit 10 receiving serial channels 12 and 14 must know the timing relationship between these channels to reconstruct the original data word from the 16 bit signals received on each serial channel 12 and 14. As discussed in the background section, this synchronization of the serial channels is typically denoted as "channel lock." Each transceiver A or B may provide this synchronizing information by asserting TXSYNC for four TXCLK cycles. Such a signal may be denoted as a synchronizing signal and will be used by the receiving SERDES unit to delay signals received on one of the serial channels 12 or 14 with respect to the remaining channel so that each transmitted 32-bit word may be properly reconstructed. In response to receiving this synchronizing signal, each SERDES 10 asserts a channel lock signal (RXCHLOCK) to signify to its transceiver that its receiving serial channel is synchronized. In addition, each transceiver A or B may receive recovered switch-cycle timing pulses RXSYNC from its SERDES unit 10.

During operation, each SERDES unit 10 cannot know, a priori, whether the serial channels 12 and 14 it transmits into are in channel lock. For example, although RXCHLOCK may have been asserted with respect to its receiving serial channel, electrical interference or other causes such as defective boards in the serial blackplane coupling the two SERDES units 10 may cause a receiving serial channel to become unstable at any time. In the present invention, all receiving serial channels are desynchronized or unlocked after any particular receiving serial channel becomes desynchronized. To enable a fast state propagation of this unlocked state between the transmitters, each transceiver A or B may transmit an "unlock" signal across its transmitting serial channel from its SERDES unit 10. The command to transmit such an unlock signal is denoted as signal TXCHCLR in FIG. 1. As determined by the design of the SERDES unit 10 implemented, the unlock signal is such that it guarantees that the corresponding receiving serial channel for the SERDES unit 10 receiving the unlock signal will be desynchronized or out of channel lock. For example, if serial channels 12 and 14 are 8B/10B encoded CML channels and each SERDES unit transmits zeroes for 8 consecutive TXCLK cycles in response to the TXCHCLR signal, the lack of transitions between bit states will typically ensure that the corresponding receiving serial channel for the SERDES unit 10 receiving the eight consecutive zeroes will be desynchronized. This forced desynchronization occurs because an 8B/10B encoded serial channel requires a certain bit transition frequency to recover the embedded clock that is not satisfied by the string of zeroes. It will be appreciated, however, that the nature of the transmitted unlock signal in response to TXCHCLR will depend upon the design of the particular SERDES unit implemented.

A SERDES unit 10, upon receiving this unlock signal, will deassert the channel lock signal RXCHLOCK. Accordingly, regardless of whether it was transceiver A or B that transmitted the unlock signal, the remaining transceiver's receiving serial channel will be forced to become desynchronized such that both transceivers A and B are out of channel lock. Moreover, an initial transmission of the unlock signal by either transceiver guarantees that the remaining transceiver will in turn transmit the unlock signal. Such a response is guaranteed because a given SERDES unit 10 cannot know whether its receiving serial channel is desynchronized because it is receiving an unlock signal or because some other failure mechanism such as electrical interference has caused the desynchronization. In response to detecting the desynchronization, the SERDES unit 10 de-asserts RXCHLOCK. In turn, the transceiver receiving the de-asserted RXCHLOCK will assert TXCHCLR to command its SERDES unit 10 to transmit the unlock signal.

As a result of the unlock signal reception, both receiving serial channels between SERDES units 10 are out of channel lock. Before duplex communication can resume between transceivers A and B, channel lock must be initiated. In the present invention, to avoid stale states, oscillation of states and "crossing paths" caused by contention between transceivers A and B should each transceiver try to initiate channel lock, only one of the devices can initiate channel lock by transmitting a synchronizing signal. Such a device may be denoted as the initializing device. The remaining transceiver may be denoted as the subject transceiver. For example, transceiver A may be the initializing transceiver, and transceiver B may be the subject transceiver. In such an embodiment, transceiver B could not initiate channel lock. Once channel lock is achieved between the two transceivers, they form a loop 8 such that A transmits to B, which in turn transmits to A, which in turn transmits to B, and so on.

Figure 2:
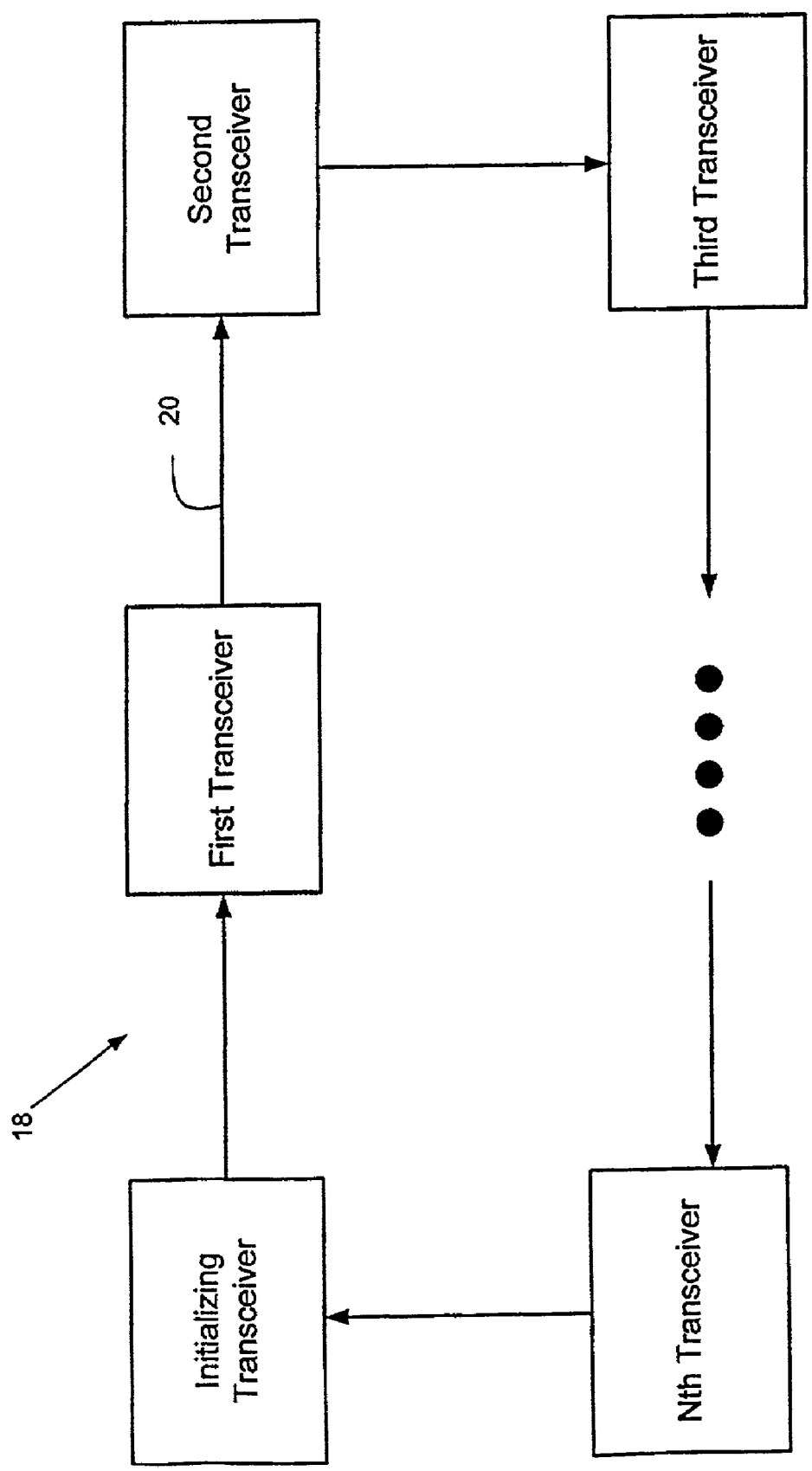
FIG. 2 is a simplified block diagram for a loop having N subject transceivers according to one embodiment of the invention.

Loop 8 of FIG. 1 may be generalized to more than just two transceivers. For example, FIG. 2 show a loop 18 having an initializing transceiver linked to a plurality of N subject transceivers such that the initializing transceiver transmits to a first subject transceiver that, in turn, transmits to a second subject transceiver, that, in turn, transmits to a third subject transceiver, and so on, until the (N−1)th subject transceiver transmits to the Nth subject transceiver. To complete loop 18, the Nth transceiver transmits to the initializing transceiver. For clarity, the SERDES units required at each end of a serial channel 20 are not illustrated. With respect to a transceiver that transmits into a given serial channel 20, the given serial channel 20 is a transmitting serial channel. With respect to a transceiver that receives this given serial channel 20, the given serial channel 20 is a receiving serial channel. If the initializing transceiver receives a de-asserted RXCHLOCK, it will transmit an unlock signal across its transmitting serial channel to the first transceiver. However, the initializing transceiver cannot know where in the loop the desynchronization started. For example, it could be that the serial channel between the initializing transceiver and the Nth transceiver is the only desynchronized channel. Alternatively, it could be that the serial channel between the second and third transceivers was the first to go out of channel lock. In such a case, the third transceiver would transmit the unlock signal to the fourth transceiver, which would transmit the unlock signal to the fifth transceiver, and so on until the initializing transceiver received the unlock signal. It really doesn't matter where the break occurred because the unlock signal, once transmitted, will guarantee that the entire loop is desynchronized. Accordingly, the initializing transceiver may initiate a channel lock at the next TXCLK cycle after detecting the de-assertion of the RXCHLOCK signal. Alternatively, the initializing transceiver may wait a certain number of clock cycles to allow the unlock signal to propagate to every link in the loop. It will be appreciated that the delay between detection of an out-of-channel-lock condition at the initializing transceiver and the transmission of a synchronizing signal is variable and within the discretion of a system designer. Once this delay has expired, the initializing transceiver may transmit a synchronizing signal to the first transceiver in the loop. Referring back to FIG. 1, the loop comprises just two transceivers. Assuming that transceiver A is the initializing transceiver, transceiver A must transmit the synchronizing signal to transceiver B.

Analogous to the unlock signal, the nature of the synchronizing signal depends upon the design of the SERDES units used to form the loop. For example, in the embodiment shown in FIG. 1, the synchronizing signal may comprise asserting TXSYNC for four cycles of the clock signal TXCLK. The receiving SERDES unit 10 is configured to recognize such a signal as the synchronizing signal. In response, the receiving SERDES unit 10 asserts RXCHLOCK to the subject transceiver B. Because transceiver B is a subject transceiver, it will only send a synchronizing signal to initializing transceiver A when RXCHLOCK is asserted. Until initializing transceiver receives this second synchronizing signal, it cannot know if the synchronizing signal it previously sent has been received or lost. Thus, initializing transceiver A will start a timeout clock simultaneously upon sending the initial synchronizing signal. The timeout period for the timeout clock is system dependent—for example, if there are only two transceivers in the system as shown in FIG. 1, the maximum amount of time it will take for: 1) transceiver B's SERDES unit to receive the synchronizing signal and then assert RXCHLOCK, 2) in response to detecting an assertion of the RXCHLOCK signal, transceiver B to pulse TXSYNC for four TXCLK cycles to its SERDES unit which then transmits the synchronizing signal to transceiver A's SERDES unit, and 3) transceiver A's SERDES unit to receive the synchronizing signal and assert RXCHLOCK to transceiver A such that transceiver A may begin sending data is relatively short compared to the amount of time required if the loop contained many subject transceivers. Moreover, the amount of time for each transceiver and SERDES unit to process the signals will also depend upon the particular hardware chosen. Should the timeout period expire before receiving an asserted RXCHLOCK (achieving channel lock), the initializing transceiver will command an unlock signal to be transmitted from its SERDES unit. Then the whole process may begin again. In other words, after transmission of this unlock signal, the initializing transceiver could transmit a synchronizing signal at the next TXCLK clock signal or may wait a variable number of clock cycles as discussed above.

Regardless of how many subject transceivers are contained in the loop, once an initializing transceiver receives a channel lock within the timeout period, the loop is ready and the initializing transceiver may begin transmitting data. Alternatively, the initializing transceiver could begin transmitting data during the timeout period after sending the initial synchronizing signal. In such an embodiment, should the timeout period expire without achieving channel lock, the transmitted data will have to be retransmitted after the initializing transceiver transmits another synchronizing signal.

Regardless of the number of transceivers used to form a loop, the present invention may be summarized in the following rules:

1) Only one of the transceivers is an initializing transceiver. The remaining subject transceivers never initiate a channel lock sequence.

2) In response to detecting that its SERDES' receiving serial channel has become desynchronized, the detecting transceiver commands its SERDES to transmit an unlock signal to the next transceiver's SERDES in the loop. The unlock signal guarantees that the receiving serial channel for this next transceiver's SERDES will be desynchronized.

3) If the initializing transceiver detects that its SERDES' receiving serial channel has become desynchronized, it will start a timeout clock and command its SERDES to transmit a synchronizing signal to the next transceiver's SERDES.

4) If the initializing transceiver times out before its SERDES receives a synchronizing signal (to indicate channel lock is achieved in the loop), the initializing transceiver will command its SERDES to transmit an unlock signal to the next transceiver's SERDES.

Note the advantages of such a loop. It is scalable to infinitely wide paths with no increase in algorithm complexity or time-to-relock after a link failure. Unlike the packetized approach discussed in the background section, no redundancy results from needlessly tearing down serial channels and re-acquiring channel lock. Moreover, the present invention receives channel lock feedback information as discussed with respect to the out-of-band second channel approach yet does not require any second channel, using the serial channel itself to provide state propagation. It will be appreciated that the present invention may be applied to any system using SERDES units to provide a link between transceivers. For example, although each SERDES unit 10 of FIG. 1 transmitted the received 32-bit word across two serial channels, a SERDES transmitting the received 32-bit word across four serial channels could also be implemented. In such an embodiment, each serial channel would transmit one byte from the 32-bit word. Moreover, the use of a 32-bit word is arbitrary and could be replaced by other word lengths. In addition, the particular formats used for the synchronizing signal and the unlock signal are arbitrary so long as their functions are achieved with the SERDES units. Finally, each SERDES unit does not have to transmit its received words across multiple serial links. Instead, a single serial channel could be used. In such an embodiment, the synchronizing signal would be used to provide bit timing in the receiving SERDES unit. Accordingly, although the invention has been described with reference to particular embodiments, the description is only an example of the invention's application and should not be taken as a limitation. Consequently, various adaptations and combinations of features of the embodiments disclosed are within the scope of the invention as encompassed by the following claims.

We claim:

1. A method for communicating between a plurality of transceivers, the transceivers being arranged in a serial communication loop such that an initializing transceiver transmits to a first transceiver, and so on until a last transceiver in the loop transmits to the initializing transceiver, wherein each transceiver has a corresponding transmitting serial channel and a receiving serial channel, the transmitting serial channel for each transceiver being the receiving serial channel for a next transceiver in the loop, comprising:

establishing duplex communication in the loop such that each receiving serial channel is synchronized with respect to its transceiver, and wherein this synchronization is unstable;

detecting a loss of synchronization in the receiving serial channel of a transceiver in the loop;

transmitting a desynchronizing signal from the detecting transceiver over its transmitting serial channel to the next transceiver in the loop; wherein reception of the desynchronizing signal by the next transceiver causes its receiving serial channel to be desynchronized, whereby a loss of synchronization in a receiving serial channel of a given transceiver in the loop is propagated to each the remaining receiving serial channel in the loop;

transmitting a first synchronizing signal from the initializing transceiver over its transmitting serial channel to the first transceiver if the initializing transceiver detects a loss of synchronization in its receiving serial channel;

starting a timeout period;

if the first synchronizing signal is received at the first transceiver, transmitting a second synchronizing signal from the first transceiver over its transmitting serial channel;

if the initializing transceiver receives the second synchronizing signal before the timeout period expires, resuming duplex communication such that each transceiver's receiving serial channel is synchronized; and if the initializing transceiver does not receive the second synchronizing signal before the timeout period expires, transmitting the desynchronizing signal from the initializing transceiver to the first transceiver, whereby the serial communication loop is protected from contention between multiple initializing transceivers.

2. The method of claim 1, wherein each receiving serial channel comprises a plurality of serial channels such that a given receiving serial channel is synchronized if signals received on its plurality of serial channels are in known timing relationship to each other.

3. The method of claim 2, wherein the plurality of serial channels for each receiving serial channel comprises two serial channels.

4. The method of claim 1, wherein each serial channel comprises only one serial channel such that a given receiving serial channel is synchronized if a clock signal transmitted over the given receiving serial channel is known by the receiving serial channel's transceiver.

5. The method of claim 2, wherein each receiving serial channel is a low voltage current mode (CML) channel.

6. The method of claim 5, wherein each CML channel is 8B/10B encoded.

7. The method of claim 1, wherein the plurality of transceivers comprises only two transceivers such that the first transceiver is the last transceiver in the loop.

8. The method of claim 1, wherein the plurality of transceivers comprises more than two transceivers.

9. A system for communication, comprising:

a plurality of transceivers arranged in a serial communication loop from an initializing transceiver to a last transceiver, each transceiver coupled to a corresponding serializer/deserializer (SERDES), each SERDES having a transmitting serial channel and a receiving serial channel arranged so that the transmitting serial channel for the initializing transceiver's SERDES is the receiving serial channel for a first transceiver's SERDES, and so on such that the transmitting serial channel for the last transceiver's SERDES is the receiving serial channel for the initializing transceiver's SERDES;

and wherein each transceiver is configured to detect a loss of synchronization in its SERDES' receiving serial channel and, in response to such a detection, command its SERDES to transmit a desynchronizing signal over its transmitting serial channel to a next SERDES in the loop, wherein reception of the desynchronizing signal by a transceiver's SERDES causes its receiving serial channel to be desynchronized, whereby a loss of synchronization in a receiving serial channel of a given transceiver's SERDES is propagated to each receiving serial channel in the loop; and wherein the initializing transceiver is configured to, in response to detecting a loss of synchronization in its receiving serial channel, command its SERDES to transmit a first synchronizing signal over its transmitting serial channel to the first transceiver's SERDES and start a timeout clock to establish a timeout period; and wherein the first transceiver is configured to, if the first synchronizing signal is received at the first transceiver's SERDES, command its SERDES to transmit a second synchronizing signal over its transmitting serial channel to a next SERDES in the loop, the initializing transceiver being configured to, if its SERDES does not receive the second synchronizing signal before the timeout period expires, command its SERDES to transmit the desynchronizing signal over its transmitting serial channel to the first transceiver's SERDES, whereby the serial communication loop is protected from contention between multiple initializing transceivers.

10. The system of claim 9, wherein each receiving serial channel comprises a plurality of serial channels such that a given receiving serial channel is synchronized if signals received on its plurality of serial channels are in known timing relationship to each other.

11. The system of claim 10, wherein the plurality of serial channels for each receiving serial channel comprises only two serial channels.

12. The system of claim 9, wherein each receiving serial channel is a low voltage current mode (CML) channel.

13. The system of claim 9, wherein the plurality of transceivers comprises only two transceivers such that the second transceiver is the last transceiver in the loop.

14. The system of claim 9, wherein the plurality of transceivers is greater than two transceivers.

* * * * *